United States Patent
Kato et al.

(10) Patent No.: US 8,834,025 B2
(45) Date of Patent: Sep. 16, 2014

(54) LINEAR MOTION GUIDE DEVICE

(75) Inventors: Soichiro Kato, Fujisawa (JP); Ryoichi Sato, Fujisawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 14/111,067

(22) PCT Filed: Feb. 20, 2012

(86) PCT No.: PCT/JP2012/001112
§ 371 (c)(1),
(2), (4) Date: Oct. 10, 2013

(87) PCT Pub. No.: WO2012/144118
PCT Pub. Date: Oct. 26, 2012

(65) Prior Publication Data
US 2014/0029876 A1  Jan. 30, 2014

(30) Foreign Application Priority Data
Apr. 22, 2011  (JP) ................................ 2011-096077

(51) Int. Cl.
*F16C 29/06* (2006.01)
*F16C 33/64* (2006.01)
*F16C 33/62* (2006.01)

(52) U.S. Cl.
CPC .............. *F16C 29/0602* (2013.01); *F16C 33/64* (2013.01); *F16C 33/62* (2013.01); *F16C 29/0642* (2013.01)
USPC ........................................................ 384/45

(58) Field of Classification Search
USPC ........................................................ 384/45
See application file for complete search history.

(56) References Cited

U.S. PATENT DOCUMENTS

| | | | | |
|---|---|---|---|---|
| 6,142,671 A * | 11/2000 | Ise | .................................. | 384/45 |
| 6,761,482 B2 * | 7/2004 | Ueno | .............................. | 384/45 |
| 7,306,373 B2 * | 12/2007 | Yamazaki et al. | .............. | 384/45 |
| 8,123,407 B2 * | 2/2012 | Shirai | ............................. | 384/43 |
| 8,601,907 B2 * | 12/2013 | Lewis et al. | .................. | 76/104.1 |
| 2004/0086209 A1 | 5/2004 | Ueno | | |

FOREIGN PATENT DOCUMENTS

| | | |
|---|---|---|
| CN | 101912888 A | 12/2010 |
| JP | 10-227313 A | 8/1998 |
| JP | 2001-335363 A | 12/2001 |
| JP | 2002-206541 A | 7/2002 |
| JP | 2003-4040 A | 1/2003 |
| JP | 2007-309363 A | 11/2007 |

OTHER PUBLICATIONS

International Search Report dated Mar. 13, 2012 w/ partial English translation (five (5) pages).
Japanese-language Written Opinion dated Mar. 13, 2012 (three (3) pages).
International Preliminary Report on Patentability dated Nov. 19, 2013 (PCT/IB/338 & PCT/IB/373), including English translation of Document C2 (Japanese-language Written Opinion (PCT/ISA/237)) previously filed on Oct. 10, 2013 (five (5) pages).
Chinese Office Action dated May 6, 2014, with English translation (9 pages).

* cited by examiner

*Primary Examiner* — Thomas R Hannon
(74) *Attorney, Agent, or Firm* — Crowell & Moring LLP

(57) ABSTRACT

In a linear motion guide device suitably applicable to applications under high-temperature and vacuum environments where no plastic end cap is applicable, and having an end cap formed by injection molding using metal powders as a raw material, the degree of adhesion of the metal powders is improved at a thin and keen portion like the scooping portion of the end cap, thereby suppressing an abrasion and a deformation. The end cap (7) is formed by injection molding (MIM: Metal Injection Molding) using metal powders of equal to or less than 20 μm as a raw material, and has a scooping portion (9) having undergone an HIP (Hot-Isostatic-Pressing) process and a thermal process.

8 Claims, 1 Drawing Sheet

LINEAR MOTION GUIDE DEVICE

TECHNICAL FIELD

The present invention relates to a linear motion guide device, in particular, a linear motion guide device which can be suitably used under a high-temperature environment including a vacuum environment at a temperature of equal to or lower than a temper temperature in a thermal process on a slider and equal to or higher than 80° C. and under a fast-speed operation environment that is equal to or faster than 2 m/sec.

BACKGROUND ART

A linear motion guide device includes a guide rail having rolling element rolling grooves in outer side faces, a slider including a rolling element rolling grooves in inner side faces so as to face with the rolling element rolling grooves of the guide rail, and provided in a slidable manner through multiple rolling elements loaded in load raceways each including the rolling element rolling grooves facing with each other, and a pair of end caps disposed at both ends of the slider so as to form endless circulation channels of the multiple rolling elements. Formed in the slider is a rolling element return channel that forms the endless circulation channel along the load raceways. The end cap has, to form the endless circulation channel, a scooping portion (tang portion) that scoops the rolling elements rolling over the load raceways, and a direction change channel that interconnects the load raceways and the rolling element return channel.

As an example application of the linear motion guide device, in an application under high temperature and vacuum environments, a plastic end cap is inapplicable. Hence, for the linear motion guide devices for such applications, the end cap is produced by Metal Injection Molding (MIM) using metal powders as a raw material (see, for example, Patent Document 1).

Conventionally, in order to improve a dimensional stability, an austeniticstainiess steel material that is a low-carbon material is used as the metal powder material. Since the austenitic stainless steel material is a low-carbon material, it is difficult to increase the hardness. Hence, a deformation and an abrasion gradually occur at the scooping portion of the end cap due to a collision with the rolling elements.

Hence, the technology disclosed in Patent Document 1 proposes an increase of the hardness of a required portion through work hardening like shot-peening, thereby suppressing an abrasion and a deformation.

PRIOR ART DOCUMENTS

Patent Documents

Patent Document 1: JP 2007-309363 A (see paragraph 0025)

SUMMARY OF THE INVENTION

Problem to be Solved

However, a further throughput improvement (cost down) to devices employing the linear motion guide device of this kind is advancing year by year, and a feeding speed was conventionally substantially 1.7 m/sec, but it becomes faster around 2.5 m/sec in practice. When the feeding speed increases to substantially 1.5 times, the energy is proportional to the square of the speed, and thus the energy of the rolling elements colliding the scooping portion becomes substantially twice. Hence, even if the technology disclosed in Patent Document 1 is applied, it becomes difficult to suppress a deformation and an abrasion of the scooping portion of the end cap.

The hardness may be improved by quenching, but in order to enhance the hardness by quenching, it is necessary for the material to contain a predetermined amount of carbon. When, however, the amount of carbon contained in the metal powder materials in the metal injection molding increases, the dimensional stability becomes poor, and thus the hardness enhancement by quenching is not a simple solution.

In particular, the tip of the scooping portion scoops the rolling elements over a tangent line while entering the rolling element rolling groove. Accordingly, the tip should be formed in a keen shape. Hence, when the hardness is simply enhanced, the toughness of the tip of the scooping portion that is thin becomes low, resulting in a chipping.

The present invention has been made in view of the above-mentioned disadvantages, and it is an object of the present invention to provide a linear motion guide device which can be suitably used in an application under high-temperature and vacuum environments where no plastic end cap is applicable, includes an end cap formed by injection molding using metal powders as a raw material, and can suppresses an abrasion or a deformation by improving the degree of adhesion of metal powders at a thin and keen portion like the scooping portion of the end cap.

Solution to the Problem

In order to accomplish the above object, according to an aspect of the present invention, there is provided a linear motion guide device that includes: a guide rail including a rolling element rolling groove formed in an outer side face; a slider which includes a rolling element rolling groove formed in an internal side face so as to face the rolling element rolling groove of the guide rail, and which is provided in a slidable manner through a plurality of rolling elements loaded in a load raceway formed by the rolling element rolling grooves facing with each other; and a pair of end caps disposed at both ends of the slider so as to form an endless circulation channel for the plurality of rolling elements. The slider includes a rolling element return channel along the load raceway, the rolling element return channel forming the endless circulation channel. The end cap includes a scooping portion that scoops the rolling elements rolling over the load raceway, and a direction change channel that interconnects the load raceway with the rolling element return channel, the scooping portion and the direction change channel forming the endless circulation channel. The end caps are each formed by injection molding (MIM: Metal Injection Molding) using metal powders having a particle diameter of equal to or less than 20 μm as a raw material. The scooping portion is subjected to an Hot-Isostatic-Pressing (HIP) process and a thermal process.

According to the linear motion guide device of an aspect of the present invention, the end cap is formed by injection molding using metal powders with a particle diameter of equal to or less than 20 μm as a raw material. Accordingly, the density is increased as much as possible, the strength is enhanced, and carbides are uniformly distributed at the time of molding. In particular, according to this end cap, an HIP process is performed on the thin scooping portion, and thus substantially the same values as those of normal steel (e.g., tension strength of substantially 1550 $N/m^2$, 0.2% proof stress of substantially 1200 $N/mm^2$) can be obtained. Hence, the degree of adhesion of the metal powders can be improved at a thin and keen portion like the scooping portion, thereby suppressing an abrasion and a deformation.

According to the linear motion guide device of an aspect of the present invention, it is preferable that the quenching hardness of the scooping portion should be set to be one to three points lower in Rockwell hardness than a quenching hardness normally obtained by the applied metal powder material. According to this structure, the toughness can be improved, and thus an impact of a collision of the rolling elements with the scooping portion can be eased, which is further effective as a countermeasure against a chipping of the tip of the scooping portion.

Advantageous Effects of the Invention

According to the present invention, in the linear motion guide device that includes an end cap formed by injection molding using metal powders as a raw material, the degree of adhesion of the metal powders is improved at a thin and keen portion like the scooping portion of the end cap, thereby suppressing an abrasion and a deformation thereof. Hence, the linear motion guide device is provided which can be suitably used in an application under high-temperature and vacuum environments where no plastic end cap is applicable. An example suitable application of such a linear motion guide device is a high-temperature environment including a vacuum environment at a temperature of equal to or lower than a temper temperature in a thermal process on a slider and equal to or higher than 80° C. and a fast-speed operation environment that is equal to or faster than 2 m/sec.

DESCRIPTION OF EMBODIMENTS

An explanation will be given of a linear guide that represents an embodiment of a linear motion guide device of the present invention with reference to the drawings as needed.

Figure 1:
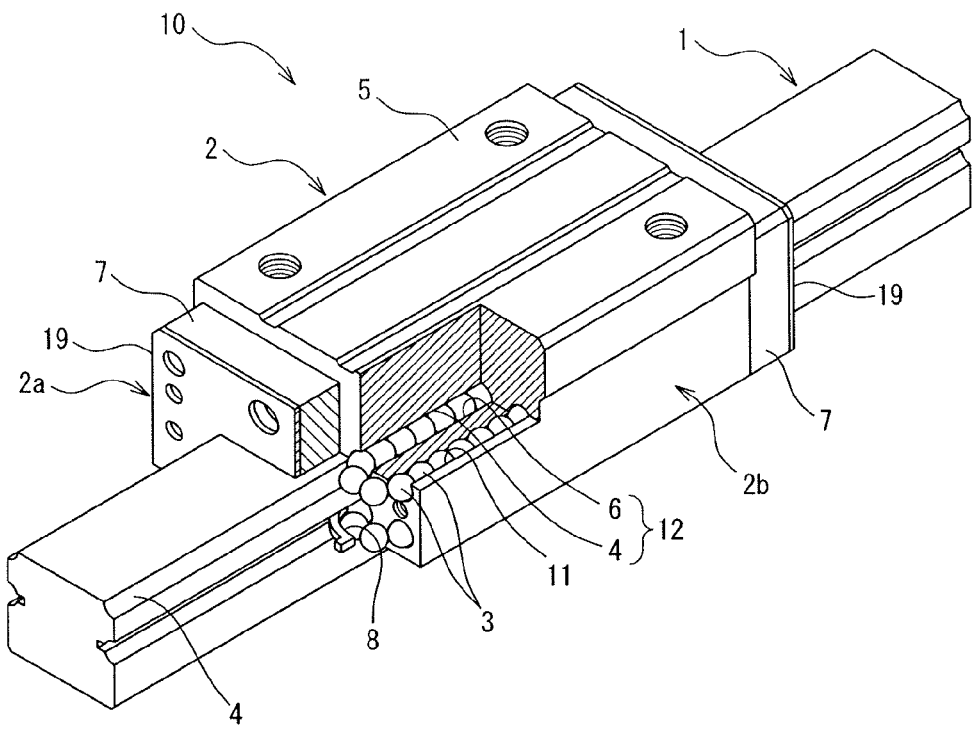
FIG. 1 is a perspective view illustrating a linear guide representing an embodiment of a linear motion guide device of the present invention, in which a part of the linear guide is drawn in a broken manner.
Figure 2:
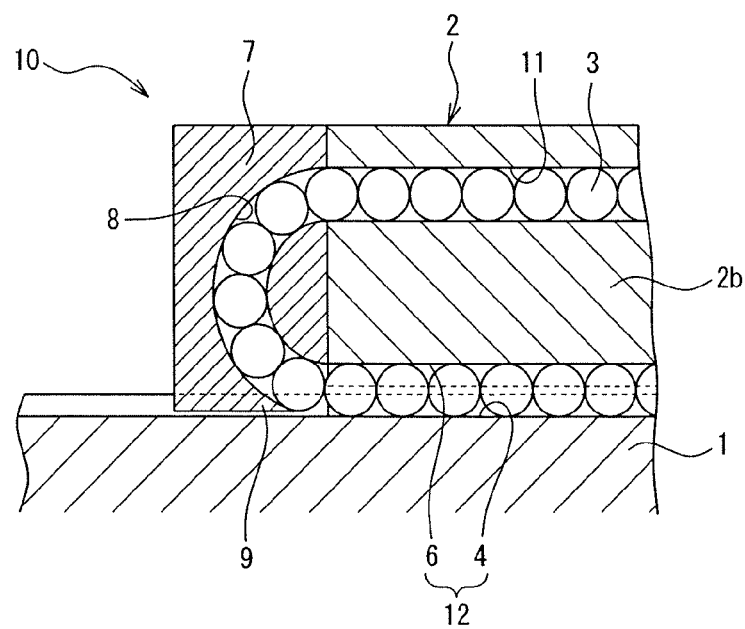
FIG. 2 is a cross-sectional view of a major part in FIG. 1.

As illustrated in FIGS. 1 and 2, a linear guide (linear motion guide device) 10 includes a guide rail 1, and a slider 2 that slides over the guide rail 1. The guide rail 1 has multiple rolling element rolling grooves 4 formed at right and left external side faces thereof. The slider 2 is formed in a U-shape having wings 2a and 2b at the right and left. The slider 2 is mounted on the guide rail 1 in a posture that the recess of the U-shape faces the guide rail 1, and the right and left wings 2a and 2b each have a rolling element rolling groove 6 formed in the internal side faces so as to face the corresponding rolling element rolling groove 4 of the guide rail 1.

This slider 2 includes a slider main body 5 and a pair of end caps 7 attached to both end faces of the slider main body 5. A protection cover 19 formed in a substantially similarity shape as that of the end cap 7 is attached to the external face of each end cap 7. The protection cover 19 is formed of a sheet metal (e.g., steel or aluminum). Each end cap 7 is held between the protection cover 19 and the slider main body 5, and is fastened thereto by unillustrated screws, thereby being fixed to the slider main body 5.

Rolling element return channels 11 are formed in the slider main body 5 so as to pass all the way therethrough along the sliding direction. Direction change channels 8 (see FIG. 2) in a substantially U-shape are formed in each end cap 7. Each direction change channel 8 interconnects respective ends of the rolling element return channel 11 and a load raceway 12 (including both rolling element rolling grooves 4 and 6 of the guide rail 1 and the slider main body 5), thereby forming each of multiple endless circulation channels in an annular shape. In each endless circulation channel, multiple rolling elements 3 are fitted in the direction change channel 8 of the end cap 7 and the rolling element return channel 11 of the slider main body 5 with a play, and are loaded in the load raceway 12. Moreover, as illustrated in FIG. 2, a scooping portion 9 that scoops, while entering the rolling element rolling groove 4, the rolling elements 3 rolling over the load raceway 12 on the tangent line, is formed in the end cap 7.

Hence, in this linear guide 10, loaded multiple rolling elements 3 roll in each endless circulation channel along with the relative motion of the slider 2 to the guide rail 1, and the rolling elements 3 over the load raceway 12 are scooped by the tip of the scooping portion 9. Accordingly, the rolling elements 3 are circulated in such a manner as to be subjected to a direction change in the direction change channel 8 of the one end cap 7, guided to the rolling element return channel 11, and returned to the load raceway 12 from the opposite portion of the direction change channel 8. While at the same time, the slider 2 smoothly relatively moves along the longitudinal direction of the guide rail 1 through the multiple rolling elements 3.

The linear guide 10 has the end cap 7 formed by injection molding using metal powders of equal to or less than 20 μm as a raw material. When the particle diameter of the metal powder material is reduced (e.g., equal to or less than 10 μm), a further improvement in density at the time of molding can be aimed. However, the smaller the particle diameter of the metal powder material becomes, the more the powders become unlikely to be gathered, and thus molding becomes difficult. Moreover, a surface area increases, and thus handling becomes also difficult. Accordingly, it is preferable that the particle diameter of the metal powder material should be within a range from 10 to 20 μm.

Moreover, the scooping portion 9 is subjected to an HIP process and a thermal process. A desirable applied material is an SKD material, in particular, SKD 11 or SKD 61 widely used for knives, etc. According to this embodiment, SKD 11 is utilized.

With respect to the condition of the HIP process, the maximum temperature was set to be 1000° C., the maximum pressure was set to be 100 MPa, and the filled gas was argon (Ar). The process target was compressed by gas pressure in an isotropic manner and was subjected to densification. By performing the HIP process, the structure is densified near a theoretical density. Hence, the sintered body is highly densified to ensure a high hardness. Moreover, the remaining pores in the sintered body can be eliminated, and thus the surface roughness of the surface is remarkably improved. Furthermore, the internal structure is made uniform, the mechanical characteristics are improved, and thus the reliability is enhanced.

It is preferable that the quenching hardness of the scooping portion 9 of the end cap 7 should be set to be, in Rockwell hardness, one to three points lower than the quenching hardness normally obtained from the metal powder material. According to such a structure, the toughness of the scooping portion 9 can be improved, which eases an impact of collision of the rolling elements 3 with the scooping portion 9, and is effective as a countermeasure against a chipping of the scooping portion 9. It is desirable that the target value of the hardness in this case should be set to be substantially the same as the hardness of the rolling element rolling grooves 4 and 6 of the slider main body 5 and the guide rail 1 constituting the linear guide 10. That is, it is preferable that the quenching hardness should be the same as the hardness of the rolling element rolling groove 4 or 6 of the slider main body 5 or the guide rail 2 and should be within a range from HRC 58 to 62 in Rockwell hardness. The reason why the hardness is set to be within a range from HRC 58 to 62 is that when it is equal to or higher than HRC 58 within the range of the quenching hardness of a rolling product, the hardness does not affect a fatigue lifetime, and when it exceeds HRC 62, such a hardness may cause a quenching cracking. The set range is also to improve the toughness.

According to the example of this embodiment, the target value of the hardness is set to be substantially the same as the hardness of the rolling element rolling grooves 4 and 6 of the slider main body 5 and the guide rail 1 constituting the linear guide 10, and as conditions of thermal process performed on the scooping portion 9, quenching is performed at a temperature of 1000 to 1050° C. (atmosphere), and tempering is performed at a temperature of 150 to 250° C. (atmosphere). Hence, according to this embodiment, in comparison with a quenching hardness normally obtained by SKD 11, the hardness can be set to be one to three points lower in Rockwell hardness than the foregoing hardness.

Next, an explanation will be given of advantageous effects of this linear guide 10.

According to the linear guide 10, the end cap 7 is formed by injection molding using metal powders with a particle diameter of equal to or less than 20 μm as a raw material, and thus carbide can be distributed uniformly. In particular, the end cap 7 has the thin scooping portion 9 having undergone the HIP process, and thus substantially the same values as those of normal steel (e.g., tension strength of substantially 1550 N/m², 0.2% proof stress of substantially 1200 N/mm²) can be obtained.

Since the HIP process is performed, the degree of adhesion of metal powders can be improved at a thin and keen portion like the scooping portion 9, thereby suppressing an abrasion and a deformation. Hence, a linear guide (linear motion guide device) can be provided which is suitably applicable to applications under high-temperature and vacuum environments where no plastic end cap is applicable. An example suitable application of this linear guide 10 is under a high-temperature environment including a vacuum environment and at a temperature of equal to or higher than 80° C. and equal to or lower than a temper temperature in a thermal process on a slider, and under a fast-speed operation environment that is equal to or faster than 2 m/sec.

According to this linear guide 10, the quenching hardness of the scooping portion 9 is set to be one to three points lower in Rockwell hardness than the quenching hardness normally obtained by the applied metal powder material (in this example, SKD 11), and thus the toughness can be improved. Hence, it is further effective to ease an impact of a collision of the rolling elements 3 with the scooping portion 9 to suppress a chipping of the scooping portion 9.

The linear motion guide device of the present invention is not limited to the above-explained embodiment, and it is needless to say that various modifications are applicable within the scope and spirit of the present invention.

When, for example, a rust-proof performance is not sufficient in comparison with a normal case in which the end cap is formed of austenitic stainless steel, a surface process normally applied to linear motion guide devices, such as chrome oxide and other processes, may be applied to the end cap 7.

Likewise, the present invention is applicable to a case in which the scooping portion (e.g., an end deflector) of a ball screw is formed of MIM.

INDUSTRIAL AVAILABILITY

As explained above, according to the present invention, in a linear motion guide device having the end cap formed by injection molding using metal powders as a raw material, the degree of adhesion of the metal powders can be improved at a thin and keen portion like the scooping portion of the end cap, thereby suppressing an abrasion and a deformation. Hence, a linear motion guide device can be provided which is suitably applicable to applications under high-temperature and vacuum environments where no plastic end cap is applicable. An example suitable application of this linear motion guide device is under a high-temperature environment including a vacuum environment at a temperature of equal to or higher than 80° C. and equal to or lower than a temper temperature of a thermal process on a slider, and under a fast-speed operation environment that is equal to or faster than 2 m/sec.

REFERENCE SIGNS LIST

1 Guide rail
2 Slider
3 Rolling element
4 Rolling element rolling groove
5 Slider main body
6 Rolling element rolling groove
7 End cap
8 Direction change channel
9 Scooping portion
10 Linear guide (linear motion guide device)
12 Load raceway

The invention claimed is:
1. A linear motion guide device comprising:
a guide rail including a rolling element rolling groove formed in an outer side face;
a slider including a rolling element rolling groove formed in an internal side face so as to face the rolling element rolling groove of the guide rail, the slider being provided in a slidable manner through a plurality of rolling elements loaded in a load raceway formed by the rolling element rolling grooves facing with each other; and
a pair of end caps disposed at both ends of the slider so as to form an endless circulation channel for the plurality of rolling elements, wherein:
the slider comprises a rolling element return channel along the load raceway, the rolling element return channel forming the endless circulation channel;
the end cap comprises a scooping portion that scoops the rolling elements rolling over the load raceway, and a direction change channel that interconnects the load raceway with the rolling element return channel, the scooping portion and the direction change channel forming the endless circulation channel;
the end caps are each formed by injection molding using metal powders having a particle diameter of equal to or less than 20 μm as a raw material; and
the scooping portion is subjected to an HIP process and a thermal process.

2. The linear motion guide device according to claim 1, wherein a quenching hardness of the scooping portion is the same as a hardness of the rolling element rolling groove of the slider or the guide rail and is within a range from HRC 58 to 62 in Rockwell hardness.

3. The linear motion guide device according to claim 2, wherein the particle diameter of the metal powder material is within a range from 10 to 20 μm.

4. The linear motion guide device according to claim 2, wherein the metal powder material is an SKD material.

5. The linear motion guide device according to claim 2, wherein as conditions of the thermal process performed on the scooping portion, quenching is performed at a temperature of 1000 to 1050° C. (atmosphere), and tempering is performed at a temperature of 150 to 250° C. (atmosphere).

6. The linear motion guide device according to claim 1, wherein the particle diameter of the metal powder material is within a range from 10 to 20 μm.

7. The linear motion guide device according to claim 1, wherein the metal powder material is an SKD material.

8. The linear motion guide device according to claim 1, wherein as conditions of the thermal process performed on the scooping portion, quenching is performed at a temperature of 1000 to 1050° C. (atmosphere), and tempering is performed at a temperature of 150 to 250° C. (atmosphere).

* * * * *